Dec. 5, 1939.  M. A. VORIS  2,181,983
AUTOMATIC DISHWASHING MACHINE
Original Filed Nov. 25, 1932   2 Sheets-Sheet 1
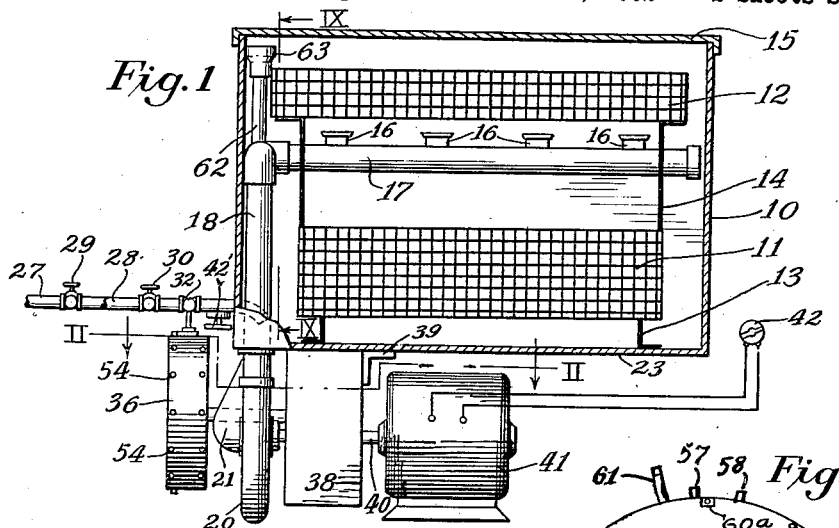
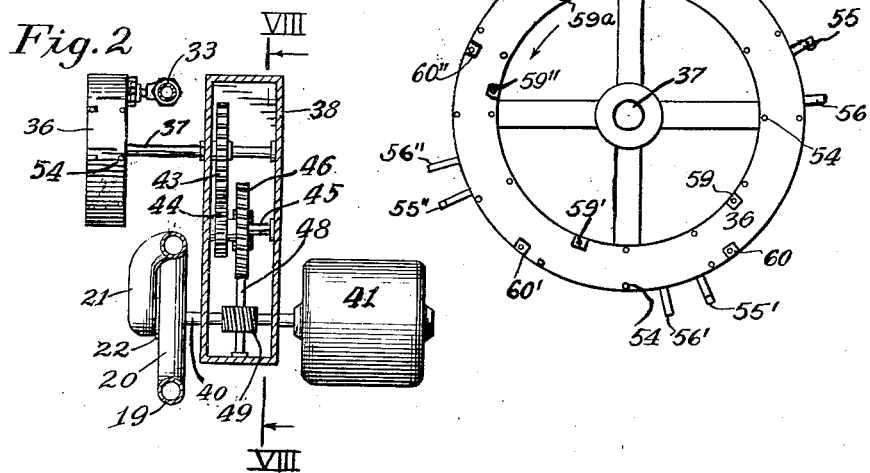
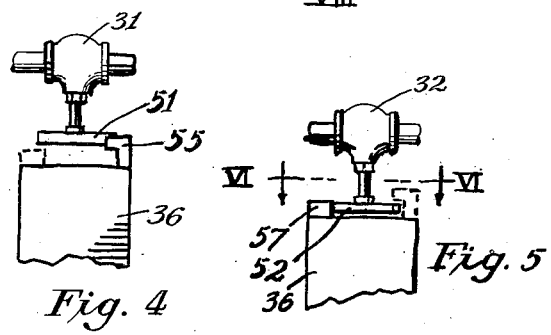
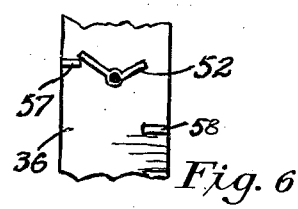
Inventor:
Mabel A. Voris
By Harry C. Hintz
Atty.

Dec. 5, 1939.  M. A. VORIS  2,181,983
AUTOMATIC DISHWASHING MACHINE
Original Filed Nov. 25, 1932  2 Sheets-Sheet 2
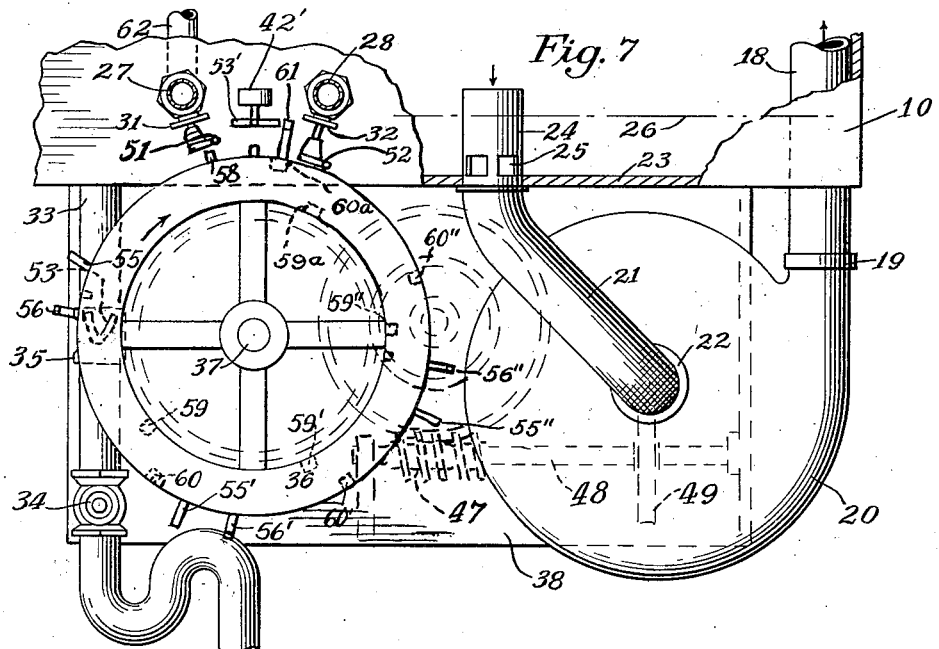
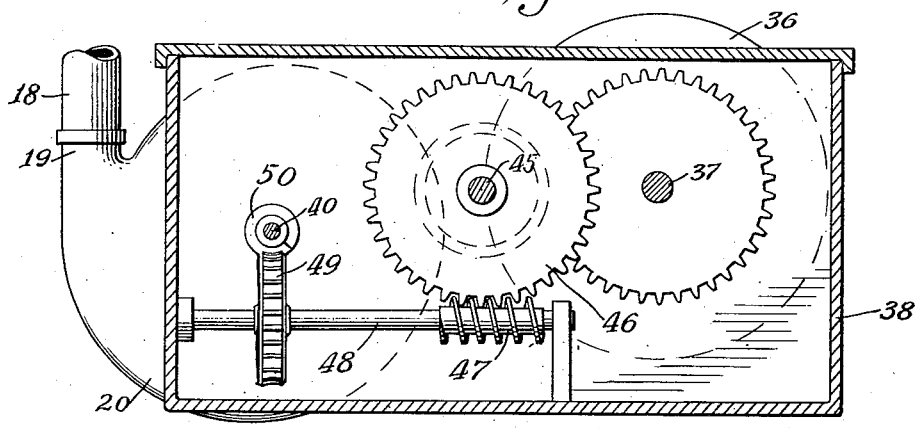
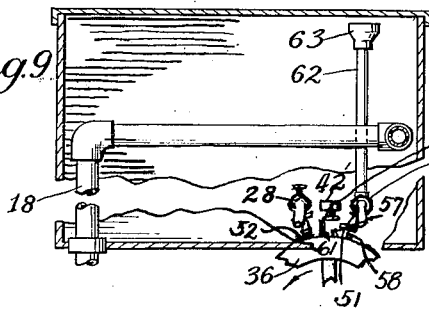
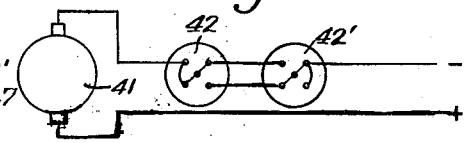
Inventor:
Mabel A. Voris
By Harry C. Deuts
Atty.

Patented Dec. 5, 1939

2,181,983

UNITED STATES PATENT OFFICE 2,181,983

AUTOMATIC DISHWASHING MACHINE

Mabel A. Voris, Seattle, Wash.

Application November 25, 1932, Serial No. 644,309
Renewed April 17, 1939

9 Claims. (Cl. 141—9)

This invention relates to dishwashing machines and more particularly to automatic dishwashing machines, although certain features thereof may be employed with equal advantage for other purposes.

It contemplates more especially the provision of an automatic dishwashing machine of simple construction and dependable operation for domestic purposes without entailing any labor or supervision of any character. This application constitutes a continuation-in-part of my application serially numbered 258,302 filed March 1, 1928, entitled "Dishwashing machines."

Numerous types of dishwashing machines have heretofore been proposed for washing dishes, but these have not proven entirely satisfactory owing to the fact that they require manual intervention and entail much time of an attendant in supervision and physical exertion. In accordance with the teachings of the instant invention, all manual intervention is rendered unnecessary and dishwashing is effected in a sequence of automatically controlled operations conducive to effective cleansing. Manual dishwashing or cleansing requires a prescribed technique of sequential operations to produce the desired results, and it is necessary for a machine to perform in a similar manner in order to accomplish equally satisfactory results.

Consequently, certain dishwashing machines of known construction require manual intervention at least in part to perform satisfactorily and duplicate the required manual cleansing treatment in order to produce satisfactory results. With other machines it is necessary to supervise the operation and entail the time of the attendant in order to complete the function of the machine, thereby defeating its own purpose and rendering the use thereof highly unsatisfactory to a degree discouraging the general adoption thereof. The defects of known machines have, therefore, been overcome by resort to mechanical operations perfected in automatic sequence to substantially duplicate the prescribed scientific technique of manual dishwashing.

One object of the present invention is to simplify the construction and improve the operation of devices of the character mentioned.

Another object is to provide an improved dishwashing machine which completely cleanses dishes and utensils without manual intervention.

Still another object is to provide a machine which sequentially performs all of the steps required to satisfactorily cleanse dishes and utensils without any required supervision or manual intervention.

A further object is to provide a self-contained power operated machine which automatically performs the necessary steps of dish and utensil cleansing in accordance with recognized technique.

A still further object is to provide a simple and compact machine that thoroughly cleanses dishes and utensils responsive to the singular act of initiating motor operation.

Still a further object is to provide a self-contained power unit having novel and simple means for performing a sequence of operations conducive to effective dish and utensil cleansing without manual supervision and intervention.

Other objects and advantages will appear from the following description of an illustrated embodiment of the present invention.

In the drawings:

Figure 1 is a sectional diagrammatic view in elevation of a device embodying features of the present invention.

Figure 2 is a sectional view taken substantially along line II—II of Figure 1.

Figure 3 is an end view in elevation of a valve control disc constituting an element of the combination described in Figures 1 and 2.

Figure 4 is a fragmentary view in elevation showing the automatic control means for the hot water valve.

Figure 5 is a similar showing of the automatic control means for the cold water valve with its actuator arm engaged by the control trip.

Figure 6 is a sectional view taken substantially along line VI—VI of Figure 5, but with the valve actuating arm displaced beyond the position shown in Figure 5.

Figure 7 is a fragmentary side view in elevation of the machine disclosed in Figure 1.

Figure 8 is a sectional view in elevation of the gear box taken substantially along line VIII—VIII of Figure 2.

Figure 9 is a sectional view taken substantially along line IX—IX of Figure 1 showing the soap supplying conduit in communication with the hot water supply pipe beyond the automatic valve.

Figure 10 is a diagrammatic view of a combined circuit having two three-way snap switches to control the motor that drives the washing instrumentalities.

The structure selected for illustration exemplifies a method of washing dishes embodying teachings of the present invention. The illustrated embodiment comprises a tank 10 of any suitable configuration and size to meet commercial requirements, it being preferably shaped from metallic sheet material possessing rigidity and non-oxidizing characteristics. In the present embodiment, the tank 10 is of substantially rectangular shape and confines a plurality of superimposed racks 11 and 12. The racks 11 and 12 are preferably of meshed wire construction and brackets 13 and 14 constitute the frame-work thereof for detachable association with the interior of the tank 10. The racks 11 and 12 serve to support dishes and other utensils such as knives, forks, spoons and analogous implements customarily employed in a household for eating purposes, and the meshed wire construction thereof permits the passage of water or other cleansing fluids therethrough after impact or contact with the dishes and utensils supported therein. A closure 15 telescopically embraces the tank 10 to preclude the discharge of water therefrom during the cleansing operations as will appear more fully hereinafter.

In order to direct a fluid discharge against the dishes and utensils supported in the racks 11 and 12, a plurality of jets or nozzles 16 are provided in a pipe line 17 supported horizontally within the tank 10 without obstruction to the racks 11 and 12 so as to permit the removal of the latter as occasion may require for accessibility and cleaning purposes. The pipe line 17 may be supported in any suitable manner, and it communicates with a vertical pipe 18 disposed interiorly along a wall of the tank 10 for communication with the discharge port 19 of a centrifugal pump 20 of standard construction supported, in this instance, beneath the tank 10. A pipe 21 extends between the intake port 22 of the pump 20 and the tank bottom 23 for communication with the interior thereof through the medium of an upstanding extension 24 and apertures 25 provided in circumferentially spaced relation therein just above the tank bottom 23 for communication with the liquid supplied thereto to a level 26 preferably beneath the inlet pipe extension 24.

Hot and cold water is supplied to the tank 10 by means of pipes 27 and 28, in communication with the end wall thereof for discharge therein from respective water supplies provided in every modern building for domestic and commercial use. Manually operated valves 29 and 30 are provided in the hot and cold water pipe lines 27 and 28 respectively, and these are merely auxiliarly to automatically controlled valves 31 and 32, respectively, as will appear more fully hereinafter. A drain pipe 33 projects through the tank bottom 23 to communicate with the interior thereof, it being provided with a manual valve 34 auxiliarly to an automatic valve 35 which is in the path of a control wheel or disc 36 common to all of the automatic valves mentioned supra. The control wheel or disc 36 is axially mounted upon a stub shaft 37 which is journalled in bearings provided in a gear housing 38 depending from the tank bottom 23 for support thereon by means of brackets 39.

In this connection, it should be noted that the centrifugal pump 20 has the rotor thereof driven by a stub shaft 40 journalled in bearings mounted in the gear housing 38, thereby affecting the journalled support thereof in parallelism with the stub shaft 37. It is to be noted that the stub shaft 40 extends through the housing 38 to constitute the armature shaft for an electric motor 41 which constitutes a direct drive therefor. An electric three-way manual switch 42 of standard design is connected to the motor 41 to control the energization and de-energization thereof to constitute the singular manual control for the otherwise automatic operation of the various instrumentalities generally described supra and which will appear more clearly hereinafter. A rotary lever operated electric three-way switch 42' of standard design is positioned in the path of the control wheel 36 for response thereto, it serving as an auxiliary to the manual switch 42 which is in a double return series circuit herewith so that the manual switch 42 or the trip operated switch 42' are either operative to start or to stop the motor 41 at the beginning or termination of the cycle of operations. It will be noted from the diagrammatic view of the circuit shown in Figure 10 that the manual three-way snap switch 42 and the lever operated three-way snap switch 42' are interposed between the source of energy and the motor 41 so that one or the other will be operative to start and/or stop the operation of the instrumentalities to commence and to terminate the cycle of operations as will appear from the foregoing description and that will be described more fully hereinafter.

In order to substantially reduce the speed of rotation of the valve control wheel or disc 36, a train of gears is interposed between the motor shaft 40 and the stub shaft 37, the latter having a comparatively large spur gear 43 fixed thereon within the gear housing 38 for meshing engagement with the smaller spur gear 44 fixed on shaft 45 intermediate the shafts 37 and 40. Further, the shaft 45 carries a comparatively larger worm wheel 46 for meshing engagement with a worm 47 carried by a stub shaft 48 disposed transversely of the shaft 40 and therebeneath to carry a worm wheel 49 in meshing engagement with a worm 50 mounted on the motor shaft 40. In consequence thereof, the speed of rotation of the stub shaft 37 is appreciably reduced so that the comparative rotation of the stub shaft 37 is very low and sufficiently slow to control the operation of the automatic valves 31, 32 and 35 responsive to the control wheel or disc 36 which is timed to revolve one revolution in approximately ten minutes, as will appear more fully hereinafter; however, this may be varied within a wide range depending upon the dictates of commercial practice.

In order to effect the operation of the valves 31, 32, and 35 or any number thereof depending upon the requirements and the desired performance, the periphery of the wheel 36 is provided with a plurality of projections serving as trips for the levers 51, 52, 53 and 53' constituting the operating means for the automatic valves 31, 32, 35 and switch 42', respectively. The trips on the control wheel 36 are inserted in their selected circumferential spaced relation in apertures 54 provided on the periphery thereof or otherwise associated therewith as commercial practice may dictate, these trips comprising projections 55 and 56 of predetermined shape and radial extension for automatically opening and closing the hot water valve 31 having the lever 51 extending in the path thereof. Similarly, projections or trips 57 and 58 extend for a comparatively shorter distance from the periphery of the wheel 36 for movement in the path of the lever 52 operatively connected to the cold water valve 32, thereby automatically opening and closing the latter responsive to the rotation of the wheel 36.

Corresponding trips 59 and 60 are, in this instance, positioned on the lateral surface of the control wheel 36 at different radial positions for movement in the path of the lever 53 constituting the operating medium for the automatic drain valve 35, thereby opening and closing the latter responsive to a complete revolution of the timing mechanism. Another trip 61 is positioned on the control wheel 36 in alignment with the auxiliary switch lever 53' to stop the motor and terminate the cycle of operations after completing the prescribed cleansing treatment and action upon the dishes. The timing of the automatic valve operations may be varied depending upon the speed of the control wheel 36 and the spaced relation of the trips 55—56, 57—58, 59—60, and 61 or any others that may be supplemented to expand the performance of the instrumentalities constituting co-ordinating elements in combination directly and sequentially responsive to the switch 42 in a circuit with the auxiliary switch 42'. It will thus be observed that the closing of the circuit accomplished by the manual manipulation of the electric switch 42 will set the instrumentalities in operation to perform the prescribed cleansing operations in accordance with recognized technique.

It is manifest that a detergent or cleansing expedient may be advantageously employed, and to this end a conduit 62 is disposed vertically along the interior wall of the tank 10 for communication with that part of the hot water supply pipe 27 which extends within the tank 10 and beyond the automatic valve 31. The pipe 62 terminates proximate to the tank closure 15 in a spout 63 which permits the feeding of powdered soap therein or other detergents so as to be incorporated in the spray or fluid jets issuing from the nozzles 16 during the first hot water application or discharge therefrom as will appear more fully infra. It should be understood that the attendant places a charge of powdered soap in the spout 63 prior to initiating the operation of the instrumentalities through the switch 42, and after placing the closure in position, there is no further supervision required.

In manual dishwashing, the following technique is recognized as effective and scientifically proper:

(a) Dishes and eating implements are cold water rinsed to removed food particles and other debris.

(b) These utensils are then subjected to washing with hot water intermixed with detergents such as powdered soap or other cleansing agents for an extent conducive to absolute cleanliness.

(c) The utensils are thereupon scalded with hot water for removing the film left by the detergent solutions and to render such spotlessly clean.

(d) It is desirable that a second hot water spray or rinse be effected to insure absolute sanitation and render such sterile.

(e) The utensils are dried in any suitable manner as modern domestic practice has improvised or prescribed as effective in any particular household.

This technique in eating implement washing has been recognized as scientifically proper by such schools as the Home Economics Department of Washington State University, and the teachings of the instant invention are such as to automatically accomplish the same dishwashing practice without resort to manual intervention or supervision. The instrumentalities described supra and their specific coordination and control perform these prescribed steps of dishwashing in automatic sequence without entailing any time, expending any physical energy or supervision. This is all accomplished by the singular act of manipulating the electric switch 42 which starts the motor 41, and thereafter the machine is thoroughly automatic and performs the successive steps of dishwashing in selected sequence. With the manipulation of the switch 42 to energize the motor 41, the following movements and operations ensue:

(A) Cold water is supplied to the tank 10 through the pipe 28 owing to the fact that the control wheel trip 57 actuates the lever 52 of the valve 32 and thereupon the dishes are sprayed for any predetermined interval, such as one minute, to rinse off all particles of food and other debris.

(B) While the dishes are cold water rinsed and when the tank 10 has been filled with cold water to the desired level, the trip 58 actuates the lever 52 of the valve 32 so as to turn off the cold water supply and the pump 20 recirculates the cold water from the tank 10 for directly spraying the dishes until the cold water rinse interval has expired.

(C) Thereupon the drain valve 35 is opened by virtue of the trip 59 and the water is drained from the tank 10, these instrumentalities being responsive to the continuous rotation of the control wheel 36.

(D) The drain valve 35 is then closed responsive to the action of the trip 60.

(E) Immediately thereafter hot water is directed to the tank 10 through the pipe 27 in that the trip 55 engages the lever 51 of the valve 31 to open the latter and the hot water issues through the nozzles 16 with a soap allowance with which the conduit 62 has been initially charged.

(F) This washing action continues for approximately five minutes and preferably the powdered soap is of a character which will not produce suds. During this interim of hot water washing, the hot water valve 31 is closed by trip 56 after a sufficient quantity is furnished to the tank 10, and the washing action continues by recirculation of the hot water through the medium of the pump 20.

(G) The drain valve 35 is opened by trip 59' after the proper washing action has endured, and the cleansing solution withdrawn from the tank 10.

(H) The drain valve 35 is closed by trip 60' after the tank 10 has been completely emptied in preparation for another charge of hot water.

(I) The hot water supply then issues to the tank 10 in that the valve 31 is again opened by trip 55' for issuance of the charge through the nozzles 16 against the dishes and eating implements confined and supported on the racks 11 and 12. This charge of hot water scalds the dishes and removes the detergent film therefrom as well as aids in removing all possible grease or fine deposits of any character.

(J) Hot water is turned off by the trip 56' after a sufficient quantity is furnished to the tank 10, and the scalding action continues by recirculation of the hot water through the medium of the pump 20 for one minute.

(K) The drain valve 35 is again opened to empty the tank 10 by the action of the trip 59" and, thereupon, the trip 60" on the control wheel 36 again closes the drain valve 35 preparatory to another cycle of operations as just described or for receiving additional charges of hot water, if desired, which is possible of as many repetitions as practice may dictate to insure sanitation and render the dishes more or less sterile.

(L) In the event that an additional hot water treatment is provided, the drain valve 35 being closed as described supra (K), the tank 10 is ready for another such cycle of use, as described from (A) to (K).

(M) In the meantime, however, continued operation of the motor 41 forces a current of air through the tank responsive to the operation of the centrifugal pump 20. This serves as a drying medium for the dishes.

(N) The circuit is then broken by the action of the trip 61 upon the switch 42' or in any other customary or approved manner, and thereupon the machine is stopped to present the dishes for use or storage as the occasion may require. Again stacking soiled utensils in the racks 11—12 and manipulating the switch 42, initiates another cycle of operations as stated supra (L).

It should be observed that any number of different trips or successive sets of corresponding trips may be provided on the control wheel 36 to perform the desired or prescribed technique of dish washing. Bearing in mind that in the illustrated embodiment, it is proposed that the control wheel 36 revolve once in ten minutes constituting the length of time required to complete the dish cleansing treatment and technique; therefore, the illustrated cycle may be divided into different time periods and during each period there is a definite performance or treatment effected. During the first period or interval of one minute, the dishes are cold water sprayed or rinsed to remove any particles of adhering food and to dissolve such substances which resist hot water such as the yolk of eggs, flour and the like. This initial one minute period is illustrated by the clockwise angular spread or distance between trips 57—59 (Figure 3) and the angular distance between 57—58 represents the operation of filling the tank 10 to the water line 26 and the valve 32 is then closed by the trip 58, and the cold water is shut off. Of course, it should be understood that the motor 41 constantly drives the centrifugal pump 20 without interruption for the full period of the complete cycle, and recirculates the water in the tank 10 during the interval of any particular treatment.

Just before the end of the first minute, the drain valve 35 is opened by the trip 59 and another interval represented by the angular distance between trips 59—60 permits emptying of the cold water from the tank 10 whereupon the drain valve 35 is closed by the trip 60. Then the hot water is turned on by the trip 55 and continues to flow into the tank 10 until the water level 26 is reached, and thereupon the hot water is shut off by the trip 60. The dishes are washed by the recirculation of the hot water coupled with the soap allowance confined in the tank 10, this continuing for a period of five minutes represented by the angular space or clockwise distance between trips 55 and 59'. Near the close of this five minute interval, the drain valve 35 is opened by the trip 59' and another interval represented by the angular distance between trips 59' and 60' permits emptying of the hot water detergent solution from the tank 10 whereupon the drain valve 35 is again closed by the trip 60'. Then the hot water valve 31 is again opened by the trip 55' and the hot water continues to flow into the tank 10 until filled to the water line 26, and thereupon the hot water is again shut off by the action of trip 56' on the valve lever 51.

The dishes are rinsed or scalded by the recirculation of the hot water for a period of two minutes represented by the angular space between trips 55' and 59". Near the close of this two minute interval, the drain valve 35 is opened by the trip 59" and another interval represented by the angular distance between trips 59" and 60" permits emptying of the hot water from the tank 10 whereupon the drain valve 35 is again closed by the trip 60". Thereafter, the dishes may be treated with another hot water rinse of one minute, if desired, merely to render the dishes more sterile, and this requires another set of corresponding trips properly spaced on the periphery of the control wheel 36. Space may be arranged therefor by further reducing the speed of the control wheel, and correspondingly narrowing the angular intervals therebetween.

In the present embodiment, this last hot water rinse is accomplished by re-opening the hot water valve 31 effected by the trip 55" and the hot water continues to flow into the tank 10 until filled to the water line 26. Thereupon, the hot water is again shut off by the action of trip 56" on the valve lever 51. The dishes are scalded by the recirculation of the hot water for a brief interval of one minute or any other interval depending upon the dictates of commercial practice. At the termination of the last scalding action, the drain valve 35 is opened by the trip 59ᵃ and the tank 10 emptied. Thereupon, the drain valve 35 is again closed by the trip 60ᵃ. The dishes are then blown dry by circulation of air created by the revolutions of the fan shaped rotor of the centrifugal pump 20 which continues to operate for a period of two minutes until the machine is shut off by the trip 61 which opens the switch 42' and shuts off the motor. The cycle is then complete, and the manual switch 42 must then be operated to repeat another cycle as described supra.

With the arrangement of parts above described, it is apparent that a novel combination of instrumentalities have been incorporated into a compact unit performing an unobviously novel function and unitary result in the art of dish washing. It is only necessary for the attendant to manipulate the switch 42 and thereupon the dishes and eating implements are automatically washed and presented for further use without requiring any further inconvenience or intervention of any character. This complete automatic performance renders dish washing machines advantageous for domestic purposes and any required manual intervention serves to detract from the preference thereto over manual methods long in use and heretofore generally practiced in spite of the presence of dishwashing machines of varied design.

The interval of each treatment is not critical and the sequence of each step or steps may be varied within the dictates of commercial practice or any particular dishwashing requirements. The placing of the trips on the drawings are diagrammatic and illustrative and should not be construed to determine the exact time interval. It is to be noted that the valves 31, 32 and 35 together with the electric switch 42' have extending control levers 51, 52, 53 and 53', respectively, consisting of radial arms spaced so that each actuation thereof will bring another radial arm in position for the successive trip. It is to be noted that the trips of each pair for successively opening and closing a valve are so located on the control wheel 36 as to pass on opposite sides of the valve control lever and thus open the valve by turning it in one direction and then close the valve by turning it a corresponding angular distance in the opposite direction. While two lever arms will ordinarily suffice for each valve lever, it may be preferable though not essential to provide more than two lever arms on each valve lever to insure the proper valve opening and closing operation even though the trip action thereon may not always displace the valve lever the same distance back and forth owing to wear in the valve or speed variations in control wheel rotation to accomplish the requirements of any particular installation or the dictates of commercial practice. The interval of each step in the procedure or the cleansing treatment imparted to the dishes and utensils, is not critical and their sequence as well as the number of treatments may be varied within the dictates of commercial practice and the particular requirements of apparatus for most effectively accomplishing the specified purpose. Specific details of construction are not important in that they are illustrative rather than a requirement of the desired performance embodying teachings of the invention.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In apparatus of the class described, valve operating means, embodying a rotary control member, a set of trips on said control member in close proximity to the periphery thereof, valve handle means in the path of said trips, another set of trips on said control member extending outwardly from the periphery thereof beyond said first named trips and clear of said valve handle means, and other valve handle means in the path of said last named trips and clear of the first named trips.

2. In automatic control means of the class described, a plurality of valves, a rotary control member, a set of trips projecting laterally from a side of said rotary control member, handle means on certain of said valves extending into the path of said laterally projecting trips, other sets of trips on the periphery of said rotary control member and operative at unequal distances from said periphery of said rotary control member, and other valve handles disposed in the respective paths of movement of said other sets of trips.

3. In a continuous dishwashing machine of the class described, the combination with cold and hot water supply means having valves for the control thereof, valve operating means embodying a rotary control member, a set of trips on said control member in proximity to the periphery thereof for actuating said cold water supply valve, valve handle means on said cold water supply valve in the path of movement of said trips, another set of trips on said control member disposed to travel in a circular path radially spaced from the aforesaid set of trips and clear of said first named valve handle means for actuating said hot water supply valve, other valve handle means in the path of movement of said hot water valve control trips and clear of said cold water valve control trips and means for rotating said valve operating means to regulate the cold and hot water supply means in a predetermined automatic sequence for selected intervals to cleanse dishes in a continuity of operations.

4. In a continuous dishwashing machine of the character described, a plurality of valves for cold and hot water regulation, a rotary control member, a set of trips projecting from the control member, handle means on said cold water valve extending into the path of said projecting trips to effect the opening and closing thereof in timed sequence, other sets of trips extending from and operative at unequal distances from the periphery of said control member relative to said first named trips, and other handle means on said hot water valve disposed in the respective paths of movement of said second named trips to open and close said hot water valve in predetermined continuous automatic sequence relative to said cold water valve for cleansing dishes in a continuity of operations.

5. In a continuous dishwashing machine of the character described, a plurality of valves for cold and hot water regulation, a journalled member, sets of trips carried by the journalled member, each set of trips being spaced at different radial points with respect to the axis of the journalled member for selected actuation of said cold and hot water valves, handle means on said cold and hot water valves extending into the paths of the trips with certain ones of the handle means operated by certain sets of trips, and means effective to rotate said journalled member to sequentially operate said valves for automatically cleansing dishes in a continuity of operations.

6. In a continuous dishwashing machine of the character described, the combination with a tank having an outlet, of cold and hot water supply means in communication with said tank, a plurality of hot and cold water supply valves for cold and hot water regulation to said tank, a journalled member, sets of trips carried by the journalled member, each set of trips being spaced at different radial points with respect to the axis of the journalled member for selected actuation of said cold and hot water valves, handle means on said cold and hot water valves extending into the paths of the trips with certain ones of the handle means operated by certain sets of trips, a drain valve for controlling said outlet for discharge of said cold and hot water from said tank, handle means on said drain valve for extension in the path of certain of said trips, said trips being so related as to operate said drain valve in predetermined alternative sequence with said cold and hot water valves responsive to the rotation of said journalled member.

7. In a self-contained automatic continuous dishwasher, the combination with a tank having a drain pipe communicating therewith, of means associated with the interior of said tank for supporting dishes in said tank, water spray means communicating with the interior of said tank for directing the discharge of water against dishes on said supporting means, hot and cold water supply pipes communicating with said tank, valves in said drain, cold and hot water supply pipes to control the passage of water therethrough, a control member for said valves, power means for actuating said valve control member, means for initiating the operation of said power means, pump means operatively connected to said power means and communicating with said spray means to forcefully direct water from said tank through said spray means, means on said control member to open and then close said cold water supply pipe valve to furnish cold water to said tank for a predetermined interval of time, means on said control member to open and then close said drain pipe valve for emptying said tank, means on said control member to open and then close said hot water supply pipe valve to furnish hot water to said tank, means on said control member to again open and then close said drain pipe valve for emptying said tank, means on said control member to again open and then close said hot water supply pipe valve to again furnish hot water to said tank, means on said control member to again open and then close said drain pipe valve for emptying said tank, and means on said control member for rendering said power means inactive after said last named means has closed said drain pipe valve.

8. In a self-contained automatic continuous dishwasher, the combination with a tank having a drain pipe communicating therewith, of means associated with the interior of said tank for supporting dishes in said tank, water spray means communicating with the interior of said tank for directing the discharge of water against dishes on said supporting means, hot and cold water supply pipes communicating with said tank, valves in said drain, cold and hot water supply pipes to control the passage of water therethrough, means for charging the hot water supply pipe with a detergent ingredient, a control member for said valves, power means for actuating said valve control member, means for initiating the operation of said power means, pump means operatively connected to said power means and communicating with said spray means to forcefully direct water from said tank through said spray means, means on said control member to open and then close said cold water supply pipe valve to furnish cold water to said tank for a predetermined interval of time, means on said control member to open and then close said drain pipe valve for emptying said tank, means on said control member to open and then close said hot water supply pipe valve to furnish hot water to said tank with the detergent ingredient intermixed therewith, means on said control member to again open and then close said drain pipe valve for emptying said tank, means on said control member to again open and then close said hot water supply pipe valve to again furnish plain hot water to said tank, means on said control member to again open and then close said drain pipe valve for emptying said tank, means on said control member to again open and then close said hot water supply pipe valve to again furnish plain hot water to said tank to sterilize the dishes, means on said control member to again open and then close said drain pipe valve for emptying said tank, and means on said control member for rendering said power means inactive after said last named means has closed said drain pipe valve.

9. In a self-contained automatic continuous dishwasher, the combination with a tank having a drain pipe communicating therewith, of means associated with the interior of said tank for supporting dishes in said tank, water spray means communicating with the interior of said tank for directing the discharge of water against dishes on said supporting means, hot and cold water supply pipes communicating with said tank, valves in said drain, cold and hot water supply pipes to control the passage of water therethrough, means for charging the hot water supply pipe with a detergent ingredient, a control member for said valves, power means for actuating said valve control member, means for initiating the operation of said power means, pump means operatively connected to said power means and communicating with said spray means to forcefully direct water from said tank through said spray means, means on said control member to cooperate with said cold water supply pipe valve for supplying cold water to said tank for removing waste deposits on said dishes, means on said control member to cooperate with said drain valve to empty said tank, means on said control member to cooperate with said hot water pipe valve to supply hot water charged with the detergent ingredient to said tank for washing the dishes, means on said control member to cooperate with said drain pipe valve to again empty said tank, means on said control member for actuating said hot water valve to supply hot water for again rinsing said dishes, means on said control member for actuating said drain pipe valve to empty said tank, and means on said control member for rendering said power means inactive after said tank has been emptied responsive to said last named means.

MABEL A. VORIS.